United States Patent
Zhu et al.

(10) Patent No.: US 11,126,753 B2
(45) Date of Patent: Sep. 21, 2021

(54) SECURE PROCESSOR CHIP AND TERMINAL DEVICE

(71) Applicant: Huawei Technologies Co., Ltd., Shenzhen (CN)

(72) Inventors: Li Zhu, Xi'an (CN); Zhihua Lu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/394,875

(22) Filed: Apr. 25, 2019

(65) Prior Publication Data

US 2019/0251298 A1 Aug. 15, 2019

Related U.S. Application Data

(63) Continuation of application No. PCT/CN2016/105942, filed on Nov. 15, 2016.

(51) Int. Cl.
*G06F 21/74* (2013.01)
*G06F 21/60* (2013.01)
(Continued)

(52) U.S. Cl.
CPC .............. *G06F 21/74* (2013.01); *G06F 9/544* (2013.01); *G06F 21/57* (2013.01); *G06F 21/604* (2013.01);
(Continued)

(58) Field of Classification Search
CPC ............................... G06F 21/74; H04W 12/40
(Continued)

(56) References Cited

U.S. PATENT DOCUMENTS 7,426,644 B1    9/2008 Strongin et al.
2002/0029345 A1* 3/2002 Kawasaki ............... G06F 21/75
                                                    713/190
(Continued)

FOREIGN PATENT DOCUMENTS

CN           1599902 A      3/2005
CN         101840391 A      9/2010
(Continued)

OTHER PUBLICATIONS

Machine Translation and Abstract of Chinese Publication No. CN105260663, Jan. 20, 2016, 14 pages.
(Continued)

*Primary Examiner* — Jae U Yu
(74) *Attorney, Agent, or Firm* — Conley Rose, P.C.

(57) ABSTRACT

A processor chip including a memory controller, application processor and a communication processor, where the memory controller is configured to define an area of memory as secure memory, and allow only an access request with a security attribute to access the secure memory. The application processor is configured to invoke a secure application in a trusted execution environment, and write an instruction request for a secure element into the secure memory using the secure application. The communication processor is configured to read the instruction request from the secure memory in the trusted execution environment, and send the instruction request to the secure element. The application processor and the communication processor need to be in the trusted execution environment when accessing the secure memory, and access the secure memory only using the secure application.

20 Claims, 4 Drawing Sheets

(51) Int. Cl.
*G06F 21/57* (2013.01)
*G06F 21/78* (2013.01)
*G06Q 20/32* (2012.01)
*G06F 9/54* (2006.01)
*H04W 12/40* (2021.01)

(52) U.S. Cl.
CPC ......... *G06F 21/78* (2013.01); *G06Q 20/3227* (2013.01); *H04W 12/40* (2021.01)

(58) Field of Classification Search
USPC ........................................................ 711/163
See application file for complete search history.

(56) References Cited

U.S. PATENT DOCUMENTS

| | | | |
|---|---|---|---|
| 2012/0116978 | A1 | 5/2012 | Bruynse et al. |
| 2013/0139230 | A1 | 5/2013 | Koh et al. |
| 2014/0044265 | A1 | 2/2014 | Kocher et al. |
| 2014/0143826 | A1 | 5/2014 | Sharp et al. |
| 2018/0367989 | A1 | 12/2018 | Zhu et al. |

FOREIGN PATENT DOCUMENTS

| | | | |
|---|---|---|---|
| CN | 102265298 | A | 11/2011 |
| CN | 103942678 | A | 7/2014 |
| CN | 103971067 | A | 8/2014 |
| CN | 104318135 | A | 1/2015 |
| CN | 104318182 | A | 1/2015 |
| CN | 104331329 | A | 2/2015 |
| CN | 104392188 | A | 3/2015 |
| CN | 105260663 | A | 1/2016 |
| CN | 105791284 | A | 7/2016 |
| TW | 201415286 | A | 4/2014 |
| TW | 201610745 | A | 3/2016 |
| WO | 2009147548 | A2 | 12/2009 |

OTHER PUBLICATIONS

Foreign Communication From a Counterpart Application, European Application No. 16921992.0, Extended European Search Report dated Oct. 7, 2019, 6 pages.
Machine Translation and Abstract of Chinese Publication No. CN103942678, Jul. 23, 2014, 11 pages.
Machine Translation and Abstract of Chinese Publication No. CN103971067, Aug. 6, 2014, 20 pages.
Machine Translation and Abstract of Chinese Publication No. CN104318135, Jan. 28, 2015, 13 pages.
Machine Translation and Abstract of Chinese Publication No. CN104331329, Feb. 4, 2015, 36 pages.
Machine Translation and Abstract of Chinese Publication No. CN104392188, Mar. 4, 2015, 17 pages.
Foreign Communication From a Counterpart Application, Chinese Publication No. 201680090854.0, Chinese Office Action dated Jan. 6, 2020, 6 pages.
Machine Translation and Abstract of Chinese Publication No. CN101840391, Sep. 22, 2010, 10 pages.
Machine Translation and Abstract of Chinese Publication No. CN104318182, Jan. 28, 2015, 25 pages.
Foreign Communication From a Counterpart Application, Taiwanese Application No. 10720863930, Taiwanese Office Action dated Sep. 17, 2018, 11 pages.
Foreign Communication From a Counterpart Application, PCT Application No. PCT/CN2016/105942, English Translation of International Search Report dated Aug. 18, 2017, 2 pages.
Foreign Communication From a Counterpart Application, PCT Application No. PCT/CN2016/105942, English Translation of Written Opinion dated Aug. 18, 2017, 5 pages.

* cited by examiner

SECURE PROCESSOR CHIP AND TERMINAL DEVICE

CROSS-REFERENCE TO RELATED APPLICATIONS

This application is a continuation of International Patent Application No. PCT/CN2016/105942 filed on Nov. 15, 2016, which is hereby incorporated by reference in its entirety.

TECHNICAL FIELD

The present disclosure relates to the field of processor technologies, and in particular, to a secure processor chip and a terminal device.

BACKGROUND

As a mobile network and an intelligent terminal develop rapidly and consumer electronics become more intelligent, there are a growing number of mobile applications of different types. No longer limited to extension in aspects of a basic function and an entertainment function of an intelligent terminal, current applications gradually expanded into fields in all industries, for example, a financial application related to mobile payment, a content copyright protection application, or a security application of a thin client in cloud computing. These industrial applications all require a terminal operating environment of a security level.

However, an operating system of an intelligent terminal device mainly focuses on requirements of functionality, instead of security. In addition, an entire system is open, huge, and complex, and therefore corresponding system vulnerabilities cannot be eliminated. As a result, some malicious programs that exploit these vulnerabilities constantly appear, and put an application program into a risk. Corresponding protection may be implemented using some software protection means, such as a firewall or antivirus software. However, because of frequent updates and upgrades of the system and constant appearances of new virus programs, the protection implemented using the software protection means cannot eliminate a security risk.

Therefore, it is necessary to provide a new security means that is different from a software protection means to meet a security requirement of various applications.

SUMMARY

The present disclosure provides a processor chip. A memory controller in the processor chip defines a secure area in memory of the processor chip as secure memory. When an application processor in the processor chip needs to access a secure element, the application processor first enters a trusted execution environment, and writes data into the secure memory using a secure application in the trusted execution environment. A communication processor needs to extract the data from the secure memory in the trusted execution environment, and then forwards the data to the secure element. The application processor and the communication processor need to be in the trusted execution environment when accessing the secure memory, and access the secure memory only using the secure application. Therefore, security of data transferred between the application processor and the secure element can be ensured using the processor chip in the present disclosure.

In an optional technical solution the secure element is integrated inside the processor chip.

The memory controller allows only an access request with a security attribute to access the secure memory.

Application programs executed by the application processor are classified into a common application and a secure application. When the application processor needs to access the secure element in a process of executing the common application, the common application enables the application processor to enter the trusted execution environment, and the application processor executes the secure application in the trusted execution environment.

When the application processor needs to access the secure element in a process of executing the common application, the common application initiates an interrupt, and the interrupt enables the application processor to suspend the common application, enter the trusted execution environment, and invoke a corresponding secure application.

An access request that is for the secure memory and sent by the application processor in the trusted execution environment has a security attribute.

In the trusted execution environment, the application processor executes the secure application, and writes an instruction request for the secure element into the secure memory under command of the secure application. Then, the secure application initiates an interrupt. The interrupt enables the application processor to suspend the secure application, and instructs the communication processor to extract data from the secure memory.

The communication processor may be always in the trusted execution environment, or may enter the trusted execution environment after receiving the interrupt initiated when the application processor executes the secure application. If the communication processor enters the trusted execution environment after receiving the interrupt, the communication processor does not exit from the trusted execution environment until a result of the secure element for the data is written into the secure memory.

The communication processor may initiate an interrupt using the secure application executed by the communication processor to instruct the application processor to extract data from the secure memory. The interrupt may also be used to enable the communication processor to exit from the trusted execution environment.

When the application processor and the communication processor initiate the access request to the secure memory in the trusted execution environment, both the application processor and the communication processor add a security identifier to the access request. The security identifier is used to indicate that the access request has the security attribute.

The communication processor is configured to perform format conversion on data according to various protocols. For example, for data to be sent using a radio port, the communication processor performs format conversion on the data according to a requirement of a communications standard, for data to be sent to the secure element, the communication processor performs format conversion on the data according to a requirement of a system in the secure element. When the communication processor needs to perform format conversion on multiple pieces of data, the communication processor performs format conversion on data sent by the secure application.

The interrupt sent between the application processor and the communication processor may be transferred using a dedicated interrupt port, or may be transferred using a bus.

The instruction request sent by the application processor to the secure element includes identity verification, certificate update, random number extraction, encryption and decryption, scrambling, descrambling, or status identification.

The status identification is determining whether the secure element can meet a requirement of the secure application.

BRIEF DESCRIPTION OF DRAWINGS

To describe the technical solutions in some of the embodiments of the present disclosure more clearly, the following briefly describes the accompanying drawings describing some of the embodiments of the present disclosure. The accompanying drawings in the following description show merely some embodiments of the present disclosure, and a person of ordinary skill in the art may still derive other drawings from these accompanying drawings without creative efforts.

DESCRIPTION OF EMBODIMENTS

A processor chip is a core component of a mobile terminal, and is responsible for principal functioning of the terminal device. When a user operates the mobile terminal, the processor chip invokes various types of data, and processes the data according to requirements of various applications. In this process, the data may be stolen using a malicious program or an attack, resulting in disclosure of sensitive information of the user. The embodiments of the present disclosure are intended to improve security of the processor chip by means of hardware in order to protect private information of the user of the terminal device.

Figure 1:
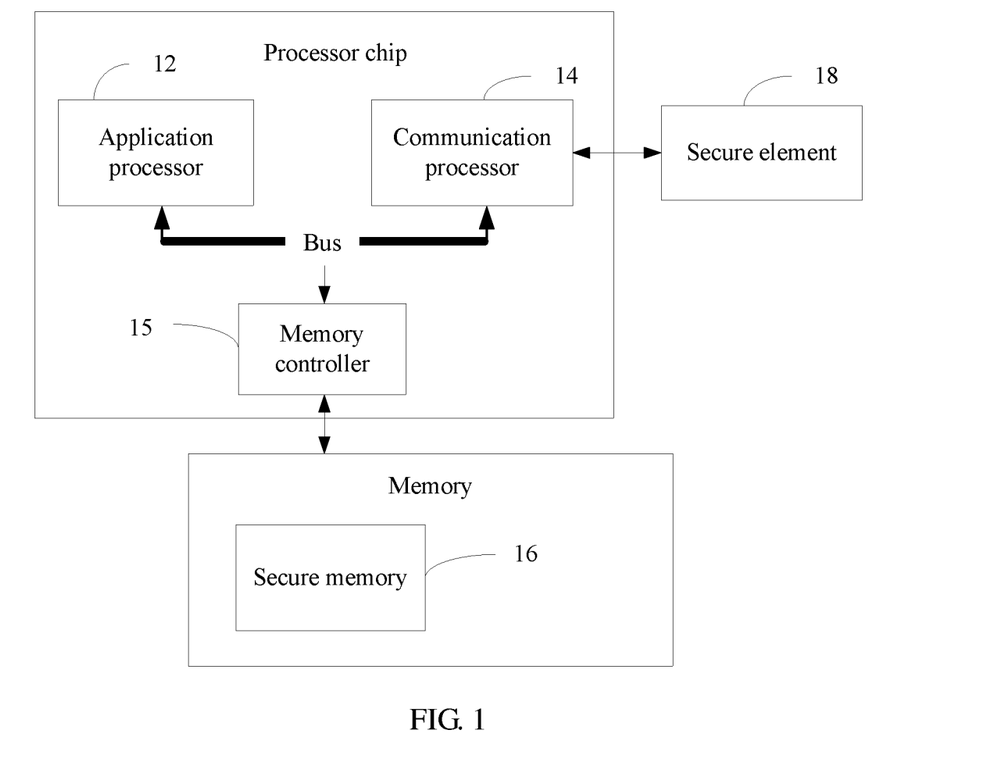
FIG. 1 is a schematic diagram of a security system according to an embodiment of the present disclosure.

FIG. 1 is a schematic diagram of a security system according to an embodiment of the present disclosure. The security system includes an application processor 12, a communication processor 14, a memory controller 15, secure memory 16, and a secure element 18 (also referred to as SE). Generally, the application processor 12, the communication processor 14, and the memory controller 15 are integrated inside a processor chip. The memory controller 15 defines an access-restricted area in the memory as the secure memory 16, and allows only an access request that has a security attribute to be read from or written into the secure memory 16. The secure element 18 usually exists as a peripheral of a terminal device, and is communicatively connected to the processor chip using a slot. Certainly, as chip integration improves, at least one of the memory or the secure element may be integrated inside the chip. This does not affect implementation of the present disclosure.

The application processor 12 is usually a central processing unit (CPU) of the processor chip, and is configured to invoke an application program (i.e., application) in an application set to implement various functions. In consideration of security, two execution environments, a rich execution environment (also referred to as REE) and a trusted execution environment (also referred to as TEE), are set for the application processor 12. Both software and hardware resources of the processor chip may be identified using a state of belonging to one of the two execution environments. In this manner, it can be ensured that software and hardware resources that have security requirements are executed by the application processor 12 in the trusted execution environment, and software and hardware resources that do not have security requirements are executed by the application processor 12 in the rich execution environment. For example, in an intelligent terminal, a current common mobile operating system such as ANDROID runs in the rich operating environment, and a secure operating system runs in the trusted execution environment. Because the secure operating system does not need to be responsible for a large quantity of operations, the secure operating system may have a simple function and a small amount of code, may be isolated, and may be manually reviewed and controlled. For this practice of using division of the rich operating environment and the trusted execution environment to ensure security of software and hardware resources in the trusted execution environment, there were precedents in the industry so long ago, for example, a TRUSTZONE technology of Acorn reduced instruction set computing (RISC) Machine (ARM) company, and a multi-CPU technology of the INTEL Corporation. Actually, because of a requirement for a security attribute in the trusted execution environment, the trusted execution environment has special requirements in aspects such as an interface of an application program and communication with a peripheral. Therefore, if a common application needs to be executed in the trusted execution environment, a program of the common application needs to change. As such, it is not common to see a case in which a common application is executed in the trusted execution environment. For example, when a user uses an intelligent terminal to visit a shopping website and make a payment, common application suspension and execution environment switching need to be performed for multiple times in this process.

Corresponding to the two execution environments, application programs are also classified into a secure application and a common application. The secure application is an application program that has a security requirement, for example, a verification program in a transaction. The secure application is deployed only in the secure operating system in the trusted execution environment, and provides a secure service for the common application deployed in the mobile operating system. When the common application invokes the secure application, the common application initiates a secure interrupt (also referred to as interprocess communication (IPC)). This secure interrupt is used to suspend the common application, instruct the application processor to switch from the rich operating environment to the trusted execution environment for execution, and invoke and access software and hardware resources in the trusted execution environment. In this case, an entire hardware device is in a trusted state, interaction between the device and the outside is under control, and it is ensured that all actions are real and trusted.

The secure element 18 stores an encryption and decryption program or a certification program that is related to the secure application in order to provide a data encryption and decryption service or a data certification service. Currently, the most common secure element is a subscriber identification module (SIM) card. The SIM card is usually issued by a carrier. An authentication system (for example, a universal serial bus (USB) shield or a user identification system) that is required for a carrier service or an online transaction, a corresponding environment system (for example, a coprocessor or a Java platform), an anti-crack security plug-in, or the like is built into the SIM card. The current secure element usually exists as a peripheral, is accommodated in a corresponding slot of an intelligent terminal using a dedicated interface, and is communicatively connected to the processor chip. There is also a practice of building the secure element into the intelligent terminal as hardware. In the chip industry, as chip integration improves, it may be considered to integrate the secure element into the chip.

When executing some secure applications in the trusted execution environment, the application processor 12 needs to perform data communication with the secure element 18. In this case, this process needs to be completed using the communication processor 14 and the secure memory 16.

The communication processor 14 is configured to perform format conversion on the data. In the processor chip field, the communication processor 14 is usually referred to as a modem, and is configured to perform format conversion on the data according to requirements of various protocols (for example, third generation of wireless mobile telecommunications technology (3G) and fourth generation of wireless mobile telecommunications technology (4G) communications protocols). A built-in system of the secure element 18 also has a unique requirement for a data format. Therefore, when a secure application executed by the application processor 12 needs to access the secure element 18, the communication processor 14 performs format conversion on data transferred between the application processor 12 and the secure element 18.

When the application processor 12 needs to send data to the secure element 18 using the communication processor 12 in a process of executing a secure application, there is a security risk in directly transferring the data between the application processor 12 and the communication processor 14 using a bus. To resolve this problem, in this embodiment of the present disclosure, it may be set that the memory controller 15 allows only an access request with a security attribute to be read from or written into the secure memory 16.

In this embodiment of the present disclosure, the access request with a security attribute indicates that the access request carries an identifiable feature, such as an identifier or a feature code. The feature can be identified by the memory controller 15, and used as an identity certificate for accessing the secure memory 16.

In an optional embodiment of the present disclosure, when the application processor 12 needs to access the secure memory 16 in a process of executing a secure application in the trusted execution environment, the application processor 12 sends an access request for the secure memory 16 to the memory controller 15 using a bus. During an operation of the secure application, the access request carries a secure state identifier to identify that the access request has a security attribute.

After the application processor 12 writes data into the secure memory 16 in the trusted execution environment, the secure application that is being executed initiates a secure interrupt again. The secure interrupt instructs the communication processor 14 to suspend an application program that is being executed, and as a notification, enables the communication processor 14 to enter the trusted execution environment and read the data from the secure memory. An access request sent by the communication processor 14 that enters the trusted execution environment carries the secure state identifier such that the communication processor 14 can access the secure memory 16. After the application processor 12 has written data into the secure memory 16 and sent the secure interrupt to the communication processor 14, the application processor 12 may return to the rich operating environment, and then continue to execute a common application. Certainly, when the communication processor 14 writes the data into the secure memory 16, and requests the application processor 12 to receive the data, the communication processor 14 also initiates a secure interrupt to the application processor 12.

In this embodiment of the present disclosure, the application processor 12 and the communication processor 14 do not need to notify each other of an address of the data in the memory. Instead, a preset manner is used such that when accessing the secure memory 16, both the application processor 12 and the communication processor 14 use a default address as a target. In this way, a process of sending address information of the data in the secure memory may be saved. Certainly, in another optional implementation, a bus or another interface may also be used to transfer address information of the data in the secure memory between the application processor 12 and the communication processor 14.

In addition to sending the data to the secure element 18 after the format conversion, the communication processor 14 is further responsible for sending, to the application processor 12, data returned by the secure element. Although a coprocessor is configured in the most common secure element, the SIM card, it is highly possible that the SIM card cannot generate a secure interrupt. Therefore, to ensure that the communication processor 14 can still write data into the secure memory 16, it may be set that the communication processor 14 does not exit from the trusted execution environment after entering the trusted execution environment and sending the data to the secure element 18. Instead, the communication processor 14 exits from the trusted execution environment only after receiving the returned data from the secure element 18 and writing the returned data into the secure memory 16. It may be set that the communication processor 14 adds a secure state identifier to the access request that is for the secure memory 16 and sent in the trusted execution environment.

There is another method for enabling the communication processor 14 to be in the trusted execution environment when the communication processor 14 needs to access the secure memory 16. For example, the communication processor 14 may be always kept in the trusted execution environment after the chip is power-on, that is, the access request sent by the communication processor 14 always carries a secure state identifier.

Further, after receiving the access request from the application processor 12, the communication processor 14 records a status of the access request using a secure application, for example, whether the access request has a security attribute. If it is recorded that the access request has the security attribute, when the communication processor 14 receives a processing result of the access request from the secure element 18, the communication processor 14 adds a security identifier to the processing result using the secure application.

A major function of communication processing is performing format conversion on data according to protocol content, and the communication processor needs to process far fewer types of applications than the application processor. Therefore, it is not very complex to set, for the communication processor, a suite of applications that can be executed in the trusted execution environment, and this mostly can be completed by a chip provider. In contrast, the application processor needs to process various applications.

When these applications need to be executed in the trusted execution environment, providers of the applications need to update the application programs according to a requirement of the trusted execution environment. This is relatively difficult. Therefore, the application processor needs to switch between the trusted execution environment and the rich execution environment, to process a secure application and a common application, while the communication processor 14 can always be in the trusted execution environment. Certainly, with popularization of security awareness, if a security requirement of an application program becomes a common sense in the industry in the future, and both a secure application and a common application can meet a requirement of the trusted execution environment, it is also possible in the future that the application processor is always in the trusted execution environment.

In the security system provided in this embodiment of the present disclosure, when sensitive information needs to be transferred between an application that is being executed and firmware in the secure element, a secure application in the trusted execution environment initiates an interrupt, information is transferred between the application processor and the communication processor using the secure memory, and the communication processor in the trusted execution environment completes interaction with the secure element. In this entire process, no insecure component or path is introduced, thereby effectively ensuring security of the sensitive information.

In addition, it should be noted that, in this embodiment of the present disclosure, the secure element is regarded as a part of the security system. However, because the secure element is usually used as a peripheral component that stores sensitive data, it may be considered from another angle that the security system in this embodiment of the present disclosure includes only the application processor, the communication processor, the secure memory, and the memory controller, and is used to access sensitive data in the secure element.

The following uses more examples to describe use of the security system in the present disclosure in various applications that have security requirements.

Figure 2:
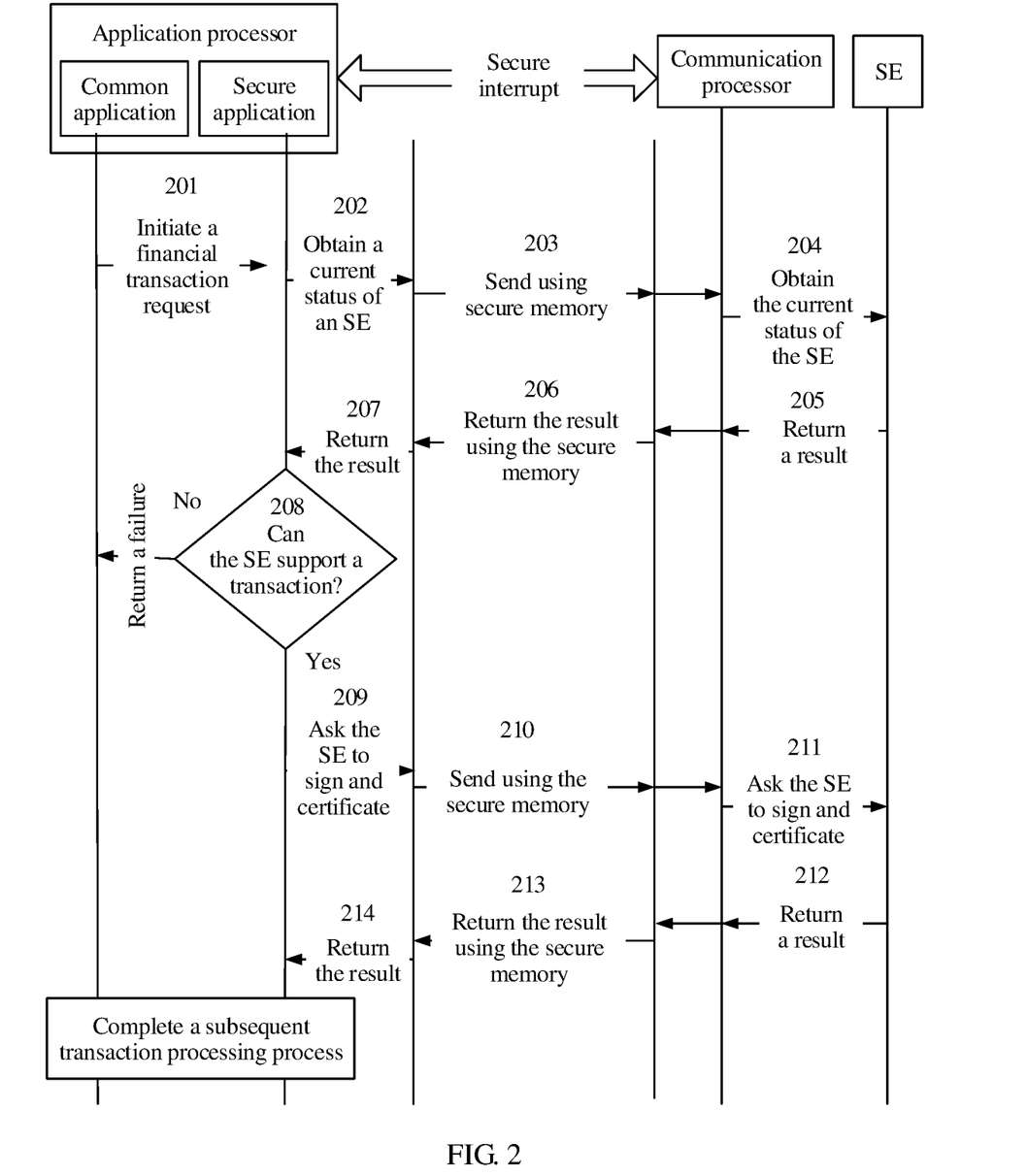
FIG. 2 is a schematic diagram of a process of implementing an online transaction in a security system according to an embodiment of the present disclosure.

FIG. 2 is a schematic diagram of a process of implementing an online transaction in a security system according to an embodiment of the present disclosure. As shown in the figure, when a common application, for example, a browser, needs to make a payment, the common application invokes a secure application that is responsible for the transaction to initiate a financial transaction request (referring to step 201). After being invoked, the secure application first sends a verification message to check a current status of a secure element, for example, determine whether the secure element can support running of the current secure application (that is, obtaining a current SE status, and referring to steps 202, 203, and 204). The verification message carries information about the secure application. The verification message is received by a communication processor using secure memory. The communication processor converts the verification message into a format that can be identified by the secure element, for example, an Application Protocol Data Unit (APDU) format. The communication processor sends a converted verification message to the secure element. The secure element maintains an application identification list (AID). The AID list records a list of application programs supported by the secure element, and corresponding status information such as a version number. The secure element searches the AID table according to the information that is about the secure application information and carried in the verification message, determines whether the secure element meets a requirement of the secure application, and generates a result of determining. The result of determining is returned to an application processor (referring to steps 205, 206, and 207) using the communication processor and the secure memory. The secure application determines, according to the result of determining, whether the secure element can support the transaction (referring to step 208). If the secure element can support the transaction, the secure application further needs to ask the secure element for a signature and certification information (referring to steps 209, 210, and 211) using the secure memory. The secure element returns the signature and the certification information to the application processor using the secure memory. After obtaining the signature and the certification information (referring to steps 212, 213, and 214), the secure application continues to execute the rest of the transaction, for example, collect transaction information of a user, such as account information and a password, encrypt the transaction information of the user using the signature and the certification information, and then send encrypted information to a carrier-side server or the like.

Figure 3:
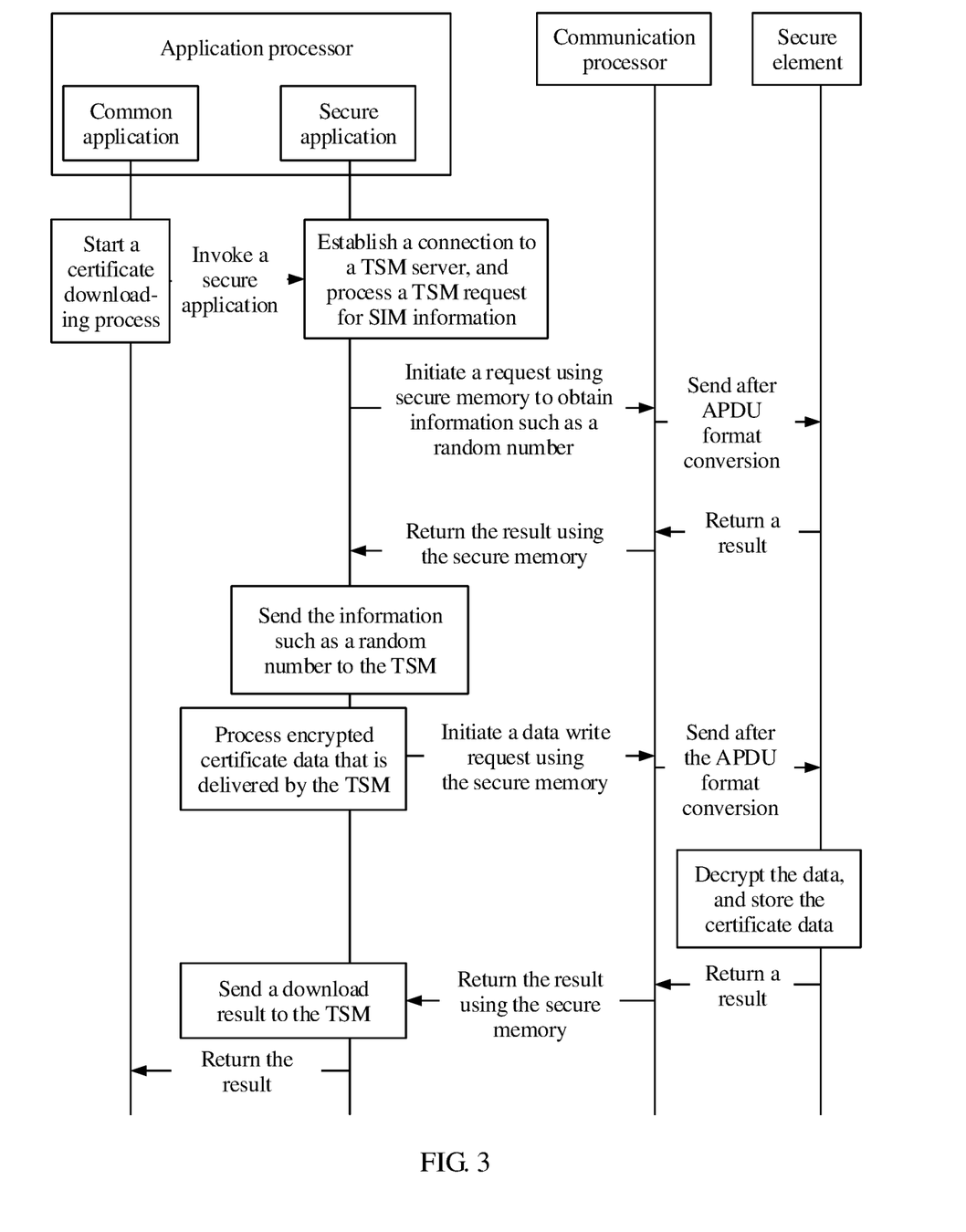
FIG. 3 is a schematic flowchart of certificate downloading in a security system according to an embodiment of the present disclosure.

The secure element may be used to store bank certificate information that is used for an online transaction. According to the security system of this embodiment in the present disclosure, the certificate information may be downloaded or updated over a network. A bank certificate downloading process is recorded in FIG. 3. It may be seen from FIG. 3 that the certificate downloading process is basically performed under control of the secure application. The secure application is responsible for completing data interaction with a trusted service management (TSM) server. The secure application is responsible for obtaining identity information of the secure element, and sending the identity information to a designated TSM server. The secure application sends to the communication processor at a time using the secure memory, to-be-written information delivered by the TSM server. Remaining work is performed by the communication processor and the secure element in the trusted execution environment. In the entire downloading process, sensitive data runs in a secure environment, and no data disclosure is caused by interference from an unauthorized program.

In addition, the secure application and the TSM server may negotiate a communication key and an integrity protection key, to ensure confidentiality and integrity of data exchanged between the secure application and the TSM. The communication key and the integrity protection key may be negotiated after a connection is successfully established between the secure application and the TSM, and a password is stored in the secure application and therefore is relatively highly secure. According to this method, a download error caused by a transmission link error can be avoided when data is delivered to the secure element.

A common secure element is an inserted SIM card or a secure element that is integrated into a chip or a terminal. However, with technological development, there is another secure element, for example, a BLUETOOTH SIM card that is interconnected to a terminal in a wireless connection manner. In this case, the communication processor mentioned in the foregoing embodiment is an interface controller (for example, a BLUETOOTH controller) connected in a wireless manner. It needs to be set that the interface controller can run in the trusted execution environment and has a corresponding secure application. When sensitive data needs to be sent to the secure element, the interface controller that is integrated into a chip or disposed inside a terminal device enters the trusted execution environment under control of a secure interrupt, and obtains the sensitive data from secure memory. The interface controller performs format conversion on the sensitive data, and then sends, using BLUETOOTH, converted data to the secure element connected in a wireless manner.

Figure 4:
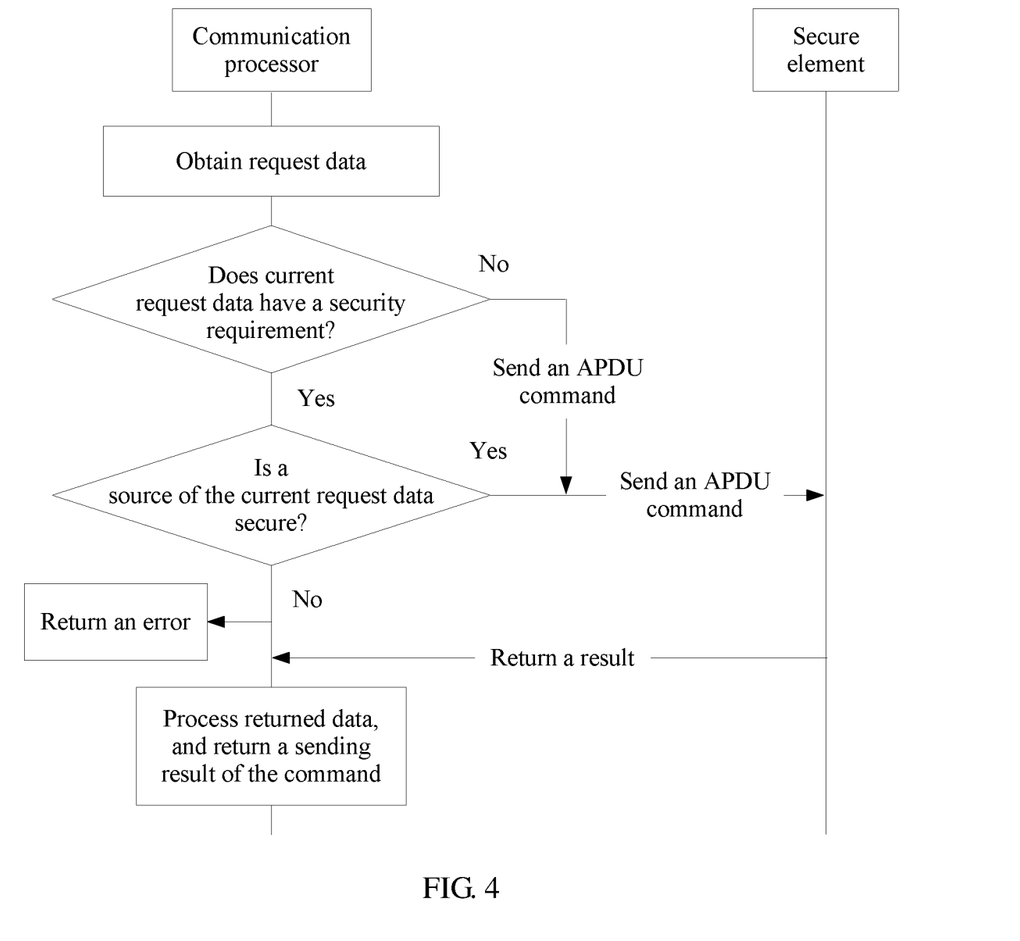
FIG. 4 is a schematic workflow diagram of a communication processor according to an embodiment of the present disclosure.

FIG. 4 is a logic diagram of processing when a communication processor receives request data whose target is a secure element. As shown in the figure, after receiving the request data, the communication processor first determines whether the request data has a security attribute. If the request data has the security attribute, the communication processor determines whether a source of the request data is a secure application served by an application processor. If the source of the request data is the secure application, the communication processor performs format conversion on the request data, and sends converted data to a secure element. If the request data does not have the security attribute, the communication processor still performs format conversion on the request data, decreases a processing priority of the request data, and first performs format conversion on request data with a security attribute.

If the request data has the security attribute but is not from the secure application served by the application processor, the communication processor sends an error message, and does not forward the request data. This is because some common applications, such as an expired application, an application that does not comply with a security specification, and a hacker program, execute a task with a security requirement in a rich execution environment, and add a security identifier to data. This does not comply with a security requirement. Therefore, the communication processor refuses to forward such request data.

In the foregoing embodiments, the description about each embodiment has a respective focus. For a part that is not described in detail in an embodiment, refer to related descriptions in other embodiments.

It may be clearly understood by a person skilled in the art that, for a convenient and brief description, for a specific working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

The above describes in detail the processor chip provided in the present disclosure. For a person of ordinary skill in the art, modifications may be made to the specific implementations and application scope according to a concept of the embodiments of the present disclosure. In conclusion, the content of the specification should not be construed as a limitation to the present disclosure.

What is claimed is:

1. A processor chip comprising:
   a memory controller configured to:
      define an area of a memory as secure memory; and
      allow only an access request with a security attribute to access the secure memory;
   an application processor coupled to the memory controller and configured to:
      execute a common application in a rich execution environment;
      enter a trusted execution environment after being triggered by the common application;
      execute a secure application in the trusted execution environment; and
      write an instruction request for a secure element into the secure memory using the secure application by sending an access request for the secure memory, wherein the access request for the secure memory sent by the application processor in the trusted execution environment has the security attribute; and
   a communication processor coupled to the memory controller and configured to:
      read the instruction request from the secure memory in the trusted execution environment; and
      send the instruction request to the secure element.

2. The processor chip of claim 1, wherein the application processor and the communication processor are further configured to add a security identifier to data sent to the secure memory in the trusted execution environment, and wherein the security identifier indicates the security attribute.

3. The processor chip of claim 1, wherein the application processor and the communication processor are further configured to add a security identifier to a request sent to the secure memory in the trusted execution environment, and wherein the security identifier indicates the security attribute.

4. The processor chip of claim 1, wherein after writing the instruction request into the secure memory, the application processor is further configured to send an interrupt to the communication processor, and wherein the interrupt enables the communication processor to enter the trusted execution environment.

5. The processor chip of claim 4, wherein the application processor is further configured to terminate the secure application after sending the interrupt.

6. The processor chip of claim 1, wherein the communication processor is further configured to perform format conversion on the instruction request according to a requirement of the secure element.

7. The processor chip of claim 1, wherein the application processor is further configured to:
   terminate the secure application after writing the instruction request into the secure memory; and
   exit from the trusted execution environment, and
   wherein the communication processor is further configured to:
      write a processing result into the secure memory; and send an interrupt to the application processor after writing the processing result into the secure memory to enable the application processor to enter the trusted execution environment again.

8. The processor chip of claim 7, wherein the application processor is further configured to:
enter the trusted execution environment again;
invoke the secure application again; and
extract the processing result from the secure memory using the secure application.

9. The processor chip of claim 1, wherein the secure element is integrated inside the processor chip.

10. The processor chip of claim 1, wherein the instruction request comprises identity verification.

11. The processor chip of claim 1, wherein the instruction request comprises certificate update.

12. The processor chip of claim 1, wherein the instruction request comprises random number extraction.

13. The processor chip of claim 1, wherein the instruction request comprises encryption and decryption.

14. The processor chip of claim 1, wherein the instruction request comprises scrambling.

15. The processor chip of claim 1, wherein the instruction request comprises descrambling.

16. The processor chip of claim 1, wherein the instruction request comprises status identification.

17. The processor chip of claim 1, wherein the processor chip is comprised in a terminal device.

18. A method for a processor chip, wherein the processor chip comprises a memory controller, an application processor, and a communication processor, and wherein the method comprises:
defining, by the memory controller, an area of a memory as a secure memory;
allowing, by the memory controller, only an access request with a security attribute to access the secure memory;
executing, by the application processor, a common application in a rich execution environment;
entering, by the application processor, a trusted execution environment after being triggered by the common application;
executing, by the application processor, a secure application in the trusted execution environment;
writing, by the application processor, an instruction request for a secure element into the secure memory using the secure application by sending an access request for the secure memory, wherein the access request for the secure memory sent by the application processor in the trusted execution environment has the security attribute;
reading, by the communication processor, the instruction request from the secure memory in the trusted execution environment; and
sending, by the communication processor, the instruction request to the secure element.

19. The method of claim 18, wherein after writing the instruction request into the secure memory, the method further comprises sending, by the application processor, an interrupt to the communication processor, and wherein the interrupt enables the communication processor to enter the trusted execution environment.

20. The method of claim 19, wherein after sending the interrupt, the method further comprises terminating, by the application processor, the secure application.

* * * * *